United States Patent
Chigiri

(10) Patent No.: US 9,455,477 B2
(45) Date of Patent: Sep. 27, 2016

(54) NON-AQUEOUS ELECTROLYTE BATTERY HAVING POLYMER LAYERS INCLUDING GRAPHITE

(71) Applicant: Sony Corporation, Tokyo (JP)

(72) Inventor: Hiroyuki Chigiri, Fukushima (JP)

(73) Assignee: Sony Corporation, Tokyo (JP)

( * ) Notice: Subject to any disclaimer, the term of this patent is extended or adjusted under 35 U.S.C. 154(b) by 23 days.

(21) Appl. No.: 14/195,567

(22) Filed: Mar. 3, 2014

(65) Prior Publication Data

US 2014/0178730 A1 Jun. 26, 2014

Related U.S. Application Data

(63) Continuation of application No. 12/254,987, filed on Oct. 21, 2008, now abandoned.

(30) Foreign Application Priority Data

Nov. 14, 2007 (JP) .................. 2007-296069
May 30, 2008 (JP) .................. 2008-142154

(51) Int. Cl.
| | |
|---|---|
| H01M 2/16 | (2006.01) |
| H01M 10/0587 | (2010.01) |
| H01M 4/133 | (2010.01) |
| H01M 4/36 | (2006.01) |
| H01M 4/587 | (2010.01) |
| H01M 10/0525 | (2010.01) |
| H01M 2/02 | (2006.01) |
| H01M 4/02 | (2006.01) |

(52) U.S. Cl.
CPC ....... *H01M 10/0587* (2013.01); *H01M 2/0275* (2013.01); *H01M 2/1653* (2013.01); *H01M 2/1673* (2013.01); *H01M 4/133* (2013.01); *H01M 4/364* (2013.01); *H01M 4/587* (2013.01); *H01M 10/0525* (2013.01); *H01M 2/0207* (2013.01); *H01M 2/0217* (2013.01); *H01M 2/0295* (2013.01); *H01M 4/02* (2013.01); *H01M 2004/021* (2013.01); *Y02E 60/122* (2013.01)

(58) Field of Classification Search
USPC ........................................ 429/163
See application file for complete search history.

(56) References Cited

U.S. PATENT DOCUMENTS

| | | | | |
|---|---|---|---|---|
| 6,391,069 | B1 * | 5/2002 | Gozdz et al. | ............ 29/623.3 |
| 6,465,125 | B1 * | 10/2002 | Takami et al. | ............ 429/127 |
| 2004/0170898 | A1 * | 9/2004 | Shibuya et al. | ........... 429/231.8 |

FOREIGN PATENT DOCUMENTS

JP 2007157592 A * 6/2007

OTHER PUBLICATIONS

EN translation of JP 2007157592 A to Sakai.*

* cited by examiner

*Primary Examiner* — Lucas J O'Donnell
(74) *Attorney, Agent, or Firm* — Chip Law Group

(57) ABSTRACT

A non-aqueous electrolyte battery is disclosed. The non-aqueous electrolyte battery include a positive electrode, a negative electrode, and a separator disposed between the positive electrode and the negative electrode. The negative electrode includes an anode mixture layer having a volume density of 1.70 to 1.90 g/cm³ prior to being subjected to charge and discharge processes. The anode mixture layer includes mixed particles composed of spherical graphite having an average particle size of 25 to 35 μm and non-spherical graphite having an average particle size of 8 to 22 μm.

20 Claims, 2 Drawing Sheets

NON-AQUEOUS ELECTROLYTE BATTERY HAVING POLYMER LAYERS INCLUDING GRAPHITE

CROSS-REFERENCE TO RELATED APPLICATIONS

The present application claims benefit of priority of Japanese patent Applications No. 2007-296069 filed in the Japanese Patent Office on Nov. 14, 2007, and No. 2008-142154 filed in the Japanese Patent Office on May 30, 2008, the entire disclosures of which are incorporated herein by reference.

BACKGROUND

The present application relates to a non-aqueous electrolyte battery. More particularly, the present application relates to a non-aqueous electrolyte battery including a positive electrode and a negative electrode which are opposed to each other through a separator.

In recent years, various types of portable electronic devices, such as camera-integrated videotape recorders (VTRs), cellular phones, and laptop computers, have come on the market, and those having smaller size and weight are being developed. As the portable electronic devices are miniaturized, batteries, particularly secondary batteries as a power source of them, are vigorously developed.

Among the secondary batteries, a lithium-ion secondary battery which possibly achieves high energy density has attracted attention. With respect to the lithium-ion secondary battery, by using a laminate film or the like as a casing member instead of a battery can made of a metal, such as aluminum or iron, the battery is being further reduced in size, weight, and thickness. The lithium-ion secondary battery is used in a wide variety of applications, so that a higher energy density in the battery has been demanded.

For achieving a lithium-ion secondary battery having a higher energy, an attempt is made to increase the volume density of the electrode mixture. For example, Japanese Unexamined Patent Application Publication No. 2003-323895 discloses a technique in which different spherical carbonaceous materials are used in the electrode mixture to improve the energy density.

SUMMARY

However, the lithium-ion secondary battery which has a electrode mixture having a high volume density suffers marked deformation when the electrode expands and shrinks repeatedly during the charge and discharge operations. Consequently, when the laminate film is used as a casing member for the lithium-ion secondary battery, the rigidity of the laminate film is poor as compared to a casing made of a metal, whereby it is difficult to prevent the battery from suffering deformation due to a change of the pressure in the battery.

Once the electrode deforms, a gap between the electrode and the separator widens, thereby increasing the cell thickness. Further, when the electrode deforms, a gap between the electrode and the separator widens, so that the battery capacity considerably deteriorates with an increase in the number of repetition of charge and discharge cycles.

Accordingly, it is desirable to provide a non-aqueous electrolyte battery which is advantageous in that the electrode mixture layer has a high volume density and the battery can be prevented from suffering deformation even when using a laminate film as a casing member, thus achieving excellent battery properties.

In accordance with an embodiment, there is provided a non-aqueous electrolyte battery which includes a positive electrode, a negative electrode, and a separator disposed between the positive electrode and the negative electrode. The negative electrode includes an anode mixture layer having a volume density of 1.70 to 1.90 g/cm$^3$ prior to being subjected to charge and discharge processes. The anode mixture layer includes mixed particle composed of spherical graphite having an average particle size of 25 to 35 µm and non-spherical graphite having an average particle size of 8 to 22 µm, thus achieving excellent battery properties.

According to an embodiment, the negative electrode has an anode mixture layer having a volume density of 1.70 to 1.90 g/cm$^3$ prior to being subjected to charge and discharge processes, whereby the negative electrode having such a high volume density contains mixed particles of spherical graphite having an average particle size of 25 to 35 µm and non-spherical graphite having an average particle size of 8 to 22 µm, thus achieving excellent battery properties.

Additional features and advantages are described herein, and will be apparent from the following Detailed Description and the figures.

DETAILED DESCRIPTION

Hereinbelow, embodiments of the present application will be described with reference to accompanying drawings. An example of the construction of a non-aqueous electrolyte battery according to an embodiment of the present application is first described with reference to FIGS. 1 and 2.

Figure 1:
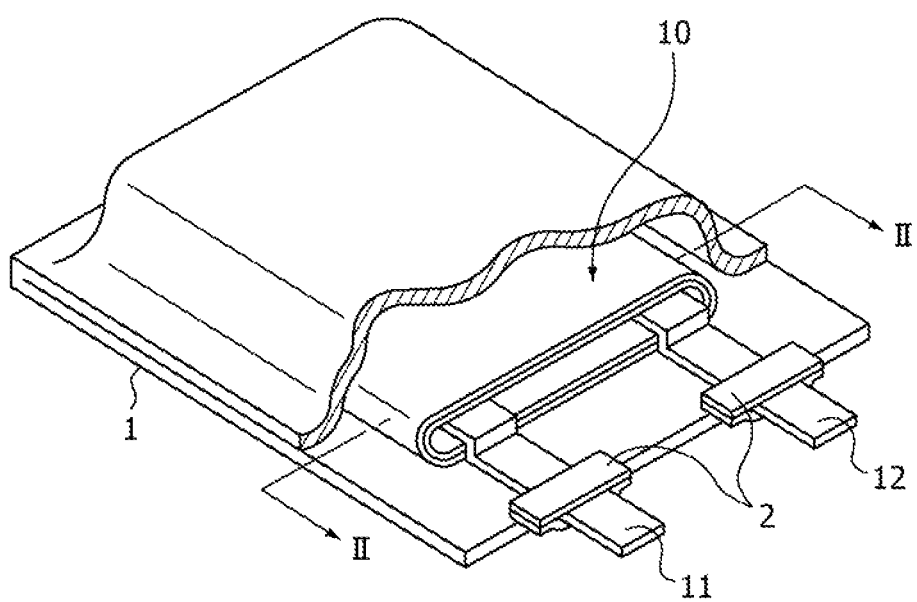
FIG. 1 is an exploded perspective view showing the construction of a non-aqueous electrolyte battery according to an embodiment of the present application.

FIG. 1 is a perspective view showing an example of the construction of a non-aqueous electrolyte battery according to an embodiment of the present application. This non-aqueous electrolyte battery is, for example, a non-aqueous electrolyte secondary battery. This non-aqueous electrolyte battery includes a spirally-wound electrode structure 10 having fitted thereto a positive electrode lead 11 and a negative electrode lead 12 and being contained in a casing member 1 in a film form, and the battery has a flattened shape.

The positive electrode lead 11 and negative electrode lead 12 individually have, for example, a strip shape, and are electrically extended from the inside of the casing member 1 to the outside, for example, in the same direction. The positive electrode lead 11 is composed of, e.g., a metal material, such as aluminum (Al), and the negative electrode lead 12 is composed of, e.g., a metal material, such as nickel (Ni).

The casing member 1 is a laminate film having a structure including, for example, an insulating layer, a metal layer, and the outermost layer which are stacked in this order and bonded together by lamination or the like. The casing member 1 is disposed so that, for example, the insulating layer constitutes the inner side, and has the respective outer edge portions sealed by heat sealing or by using an adhesive.

The insulating layer is composed of a polyolefin resin, such as polyethylene, polypropylene, modified polyethylene, modified polypropylene, or a copolymer thereof. The use of these materials provides the reduction in moisture permeability of the casing member, thereby achieving excellent airtightness. The metal layer is made of aluminum, stainless steel, nickel, iron, or the like in the form of foil or plate. The outermost layer may be composed of, for example, the same resin as that used for the insulating layer, or nylon or the like. In this case, the casing member can be improved in resistance to breakage, nail penetration, or the like. The casing member 1 may have any layer other than the insulating layer, metal layer, and outermost layer.

A bonding film 2 is inserted to portions between the casing member 1 and the positive electrode lead 11, and between the casing member 1 and the negative electrode lead 12. The bonding film 2 improves the adhesion of the positive electrode lead 11 and negative electrode lead 12 to the inner side of the casing member 1 to prevent external air from going into the battery. The bonding film 2 is composed of a material having bonding properties with the positive electrode lead 11 and negative electrode lead 12, and, for example, when the positive electrode lead 11 and negative electrode lead 12 are individually composed of the above-mentioned metal material, it is preferred that the bonding film 2 is made of a polyolefin resin, such as polyethylene, polypropylene, modified polyethylene, or modified polypropylene.

Figure 2:
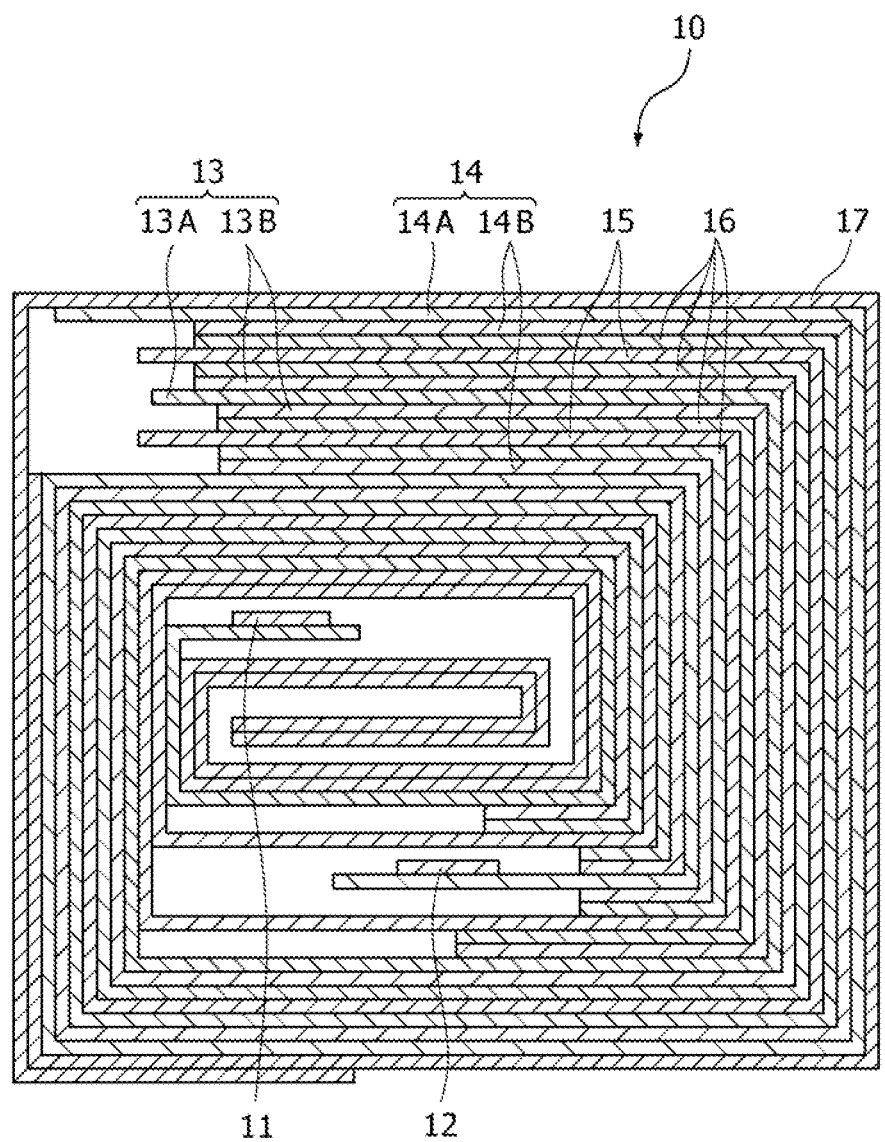
FIG. 2 is a cross-sectional view of the spirally-wound electrode structure shown in FIG. 1, taken along the line II-II.

FIG. 2 is a cross-sectional view of the spirally-wound electrode structure 10 shown in FIG. 1, taken along the line II-II. The spirally-wound electrode structure 10 includes a positive electrode 13, a negative electrode 14, a separator 15, and polymer compound layers 16 formed on both sides of the separator 15, wherein the separator 15 and polymer compound layers 16 are disposed between the positive electrode 13 and the negative electrode 14. The outermost winding layer is preferably protected by a protective tape 17, but there can be used no protective tape.

The positive electrode 13 includes, for example, a positive electrode current collector 13A and cathode mixture layers 13B formed on both sides of the positive electrode current collector 13A. The positive electrode current collector 13A is composed of, for example, a metallic foil, such as an aluminum foil.

The cathode mixture layer 13B includes, for example, as a cathode active material, at least one positive electrode material capable of occluding and releasing lithium (Li) which is an electrode reactive substance, and optionally a conductor, such as a carbon material, and a binder, such as polyvinylidene fluoride.

With respect to the positive electrode (cathode) material capable of occluding and releasing lithium, a lithium composite oxide having lithium and a transition metal, a lithium metal phosphate compound having an olivine structure, or the like can be used. Specifically, for example, $LiCoO_2$, $LiNiO_2$, $LiMn_2O_4$, $LiCo_{0.33}Ni_{0.33}Mn_{0.33}O_2$, or $LiFePO_4$ can be used.

As with the positive electrode 13, the negative electrode 14 includes, for example, a negative electrode current collector 14A and anode mixture layers 14B formed on both sides of the negative electrode current collector 14A. The negative electrode current collector 14A is composed of, for example, a metallic foil, such as a copper foil.

The anode mixture layer 14B includes, for example, at least one negative electrode (anode) material capable of occluding and releasing lithium, and optionally a conductor and a binder.

With respect to the negative electrode (anode) material, a mixture of spherical graphite and non-spherical graphite is used. The term "spherical graphite" used herein means a carbon material, such as artificial graphite, natural graphite, easily graphitizable carbon, or hardly graphitizable carbon, which has a shape of sphere or substantial sphere. The term "non-spherical graphite" used herein means a carbon material, such as artificial graphite, natural graphite, easily graphitizable carbon, or hardly graphitizable carbon, which has a shape of flake, fiber, or bulk. More specifically, examples of spherical graphite include mesocarbon microbeads (MCMB) which are artificial graphite, and examples of non-spherical graphite include powder obtained by pulverizing MCMB.

The negative electrode material includes mixed particles of spherical graphite having an average particle size of 25 to 35 μm and non-spherical graphite having an average particle size of 8 to 22 μm, and the mixed particles preferably have particle size distribution such that D10 is 5 to 11 μm, D50 is 13 to 25 μm, and D90 is 27 to 45 μm. When using the above negative electrode material, excellent properties can be obtained.

In the measurement of particle size distribution, a laser diffraction-type particle size distribution measuring machine (manufactured and sold by SEISHIN ENTERPRISE CO., LTD.; trade name: LMS-30) or the like can be used. A particle size distribution is represented by a particle size distribution in terms of a volume. For example, D10 of 5 to 11 μm indicates that a particle size such that the cumulative value of particle size distribution is 10% is 5 to 11 μm. An average particle size is a value of D50 obtained when particle size distribution is measured similarly using a laser diffraction-type particle size distribution measuring machine (manufactured and sold by SEISHIN ENTERPRISE CO., LTD.; trade name: LMS-30) or the like.

With respect to the mixed particles, there are preferably used mixed particles of MCMB as spherical graphite and an MCMB pulverized product as non-spherical graphite, which is obtained by pulverizing MCMB and non-crystallizing the pulverized plane of MCMB. Measurement of X-ray diffraction (XRD) (manufactured and sold by Rigaku Corporation; trade name: RINT) with respect to the mixed particles identifies that the mixed particles are composed solely of MCMB. Examination under a scanning electron microscope (SEM) (manufactured and sold by JEOL LTD.; trade name: JSM-5600LV) ascertains that the mixed particles include spherical particles and pulverized particles.

With respect to the negative electrode 14, a negative electrode having an anode mixture layer 14B having a volume density controlled to fall within the range of from 1.70 to 1.90 g/cm$^3$ prior to being subjected to charge and discharge processes, i.e., a so-called high volume-density negative electrode is used. In cell ready for shipping, the anode mixture layer 14B in the completely discharged state preferably has a volume density in the range of from 1.50 to 1.90 g/cm$^3$. The completely discharged state means a state in which the battery has been discharged at a constant-current of 0.2 C until the voltage becomes 3.0 V. Cells ready for shipping include, for example, a cell which has been once charged to a predetermined voltage, a cell which has been charged once and discharged to a voltage suitable for shipping, and a cell which has not yet been charged and discharged and which is put on the market as a product.

The separator 15 is composed of, for example, a porous film made of a polyolefin resin material, such as polypropylene or polyethylene, or a porous film made of an inorganic material, such as ceramic nonwoven fabric, and a separator composed of two or more porous films stacked into a laminated structure may be used.

The polymer compound layer 16 has a uniform thickness, and includes an electrolytic solution and a polymer compound retaining the electrolytic solution, and it is in a so-called gel form. The electrolytic solution includes an electrolyte salt and a solvent dissolving the electrolyte salt. Examples of electrolyte salts include lithium salts, such as $LiPF_6$, $LiClO_4$, $LiBF_4$, $LiN(CF_3SO_2)_2$, $LiN(C_2F_5SO_2)_2$, and $LiAsF_6$. The electrolyte salts may be used individually or in combination.

Examples of solvents include non-aqueous solvents, e.g., carbonic ester solvents, such as ethylene carbonate, propylene carbonate, vinylene carbonate, dimethyl carbonate, ethylmethyl carbonate, and diethyl carbonate; ether solvents, such as 1,2-dimethoxyethane, 1-ethoxy-2-methoxyethane, 1,2-diethoxyethane, tetrahydrofuran, and 2-methyltetrahydrofuran; lactone solvents, such as γ-butyrolactone, γ-valerolactone, δ-valerolactone, and ε-caprolactone; nitrile solvents, such as acetonitrile; sulfolane solvents; phosphoric acid; phosphate solvents; and pyrrolidone. The solvents may be used individually or in combination.

For improving the properties, an additive, e.g., a cyclic carbonic ester derivative, such as 4-fluoro-1,3-dioxolan-2-one or 4,5-difluoro-1,3-dioxolan-2-one, may be added to the solvent.

With respect to the polymer compound, a fluorine polymer compound is used. An example of the fluorine polymer compound include a polymer compound including repeating units derived from vinylidene fluoride. Specific examples include polyvinylidene fluoride and a copolymer of vinylidene fluoride and hexafluoropropylene. Other fluorine polymer compounds may be used. More specifically, for example, polytetrafluoroethylene and derivatives thereof can be used individually or in combination. Polychlorotrifluoroethylene (PCTFE), polyvinyl fluoride (PVF), a perfluoroalkoxy fluororesin (PFA), a tetrafluoroethylene-hexafluoropropylene copolymer (FEP), an ethylene-tetrafluoroethylene copolymer (ETFE), an ethylene-chlorotrifluoroethylene copolymer (ECTFE), and the like may be used individually or in combination.

A polymer compound having bonding force other than the fluorine polymer compound may be used. Specifically, for example, polyacrylonitrile, polyethylene oxide, polymethyl methacrylate, polyvinyl chloride, a styrene-butadiene rubber, and derivatives thereof may be used individually or in combination.

The polymer compound layer 16 is formed by, for example, forming a porous fluorine polymer compound on the separator 15 and then allowing the porous fluorine polymer to retain an electrolytic solution. The porous fluorine polymer compound may be formed by applying a solution obtained by dissolving a fluorine polymer compound in a solvent, such as N-methyl-2-pyrrolidone (NMP), to both sides of the separator 15 and drying the solution applied.

It is preferred that the polymer compound layer 16 has a peel strength of 5 mN/mm or more with the electrode and the separator. A peel strength can be measured by, for example, pulling at a rate of 100 mm/min the negative electrode and separator bonded with each other so that the separator peels off the negative electrode and determining this peel strength by means of a digital force gauge (manufactured and sold by IMADA CO., LTD.).

Also when the polymer compound layer 16 contains as filler a compound having a high heat resistance, such as $Al_2O_3$, $SiO_2$, $TiO_2$, or BN (boron nitride), the polymer compound layer maintains its bonding properties and hence achieves the similar effect.

Next, an example of the method for producing a non-aqueous electrolyte battery according to an embodiment of the present application is described.

A cathode mixture layer 13B is formed on a positive electrode current collector 13A to prepare a positive electrode 13. The cathode mixture layer 13B is formed by, for example, mixing together a cathode active material, a conductor, and a binder and dispersing the resultant mixture in a solvent, such as N-methyl-2-pyrrolidone (NMP), to form a paste, and then applying the paste to the positive electrode current collector 13A and drying the paste and subjecting it to compression molding.

An anode mixture layer 14B is formed on a negative electrode current collector 14A to prepare a negative electrode 14. The anode mixture layer 14B is formed by, for example, mixing together an anode active material and a binder and dispersing the resultant mixture in a solvent, such as N-methyl-2-pyrrolidone (NMP), to form a paste, and then applying the paste to the negative electrode current collector 14A and drying the paste and subjecting it to compression molding. Then, a positive electrode lead 11 is fitted to the positive electrode current collector 13A, and a negative electrode lead 12 is fitted to the negative electrode current collector 14A.

A solution obtained by dissolving a fluorine polymer compound in a solvent, such as N-methyl-2-pyrrolidone (NMP), is applied to both sides of a separator 15, and the resultant separator is immersed into a poor solvent, such as water, and then dried using hot air or the like to form a porous fluorine polymer compound layer on both sides of the separator 15.

The positive electrode 13, separator 15, negative electrode 14, and separator 15 are stacked on one another and spirally wound together, and a protective tape 17 is bonded with the outermost winding layer to form a spirally-wound electrode structure 10, and then the electrode structure is disposed between a folded casing member 1, and three sides of the outer edge portion of the casing member 1 are heat-sealed under a reduced pressure. In this instance, a bonding film 2 is inserted into portions between the positive electrode lead 11 and the casing member 1 and between the negative electrode lead 12 and the casing member 1.

Then, an electrolytic solution is injected into the resultant casing member, and the remaining one side of the outer edge portion is heat-sealed under a reduced pressure to hermetically seal the casing member. The casing member is finally hot-pressed to obtain a non-aqueous electrolyte battery according to an embodiment. Upon heating for the hot pressing, part of or whole of the porous fluorine polymer compound becomes in a gel form, thus forming a polymer compound layer 16.

EXAMPLES

The present application will be described in more detail with reference to the following Examples, which should not be construed as limiting the scope of the present application.

Studies on Optimum Negative Electrode
Sample 1

As a negative electrode material, mixed particles including spherical graphite having an average particle size of 31.7 μm and non-spherical graphite having an average particle size of 7.2 μm mixed in a 1:1 mass ratio, and having particle size distribution such that D10 is 4.1 μm, D50 is 10.5 μm, D90 is 29.6 μm were prepared. To the mixed particles was added PVdF as a binder, and the resultant mixture was dispersed in NMP as a solvent, and the dispersion was applied to a Cu foil and dried, followed by pressing so that the volume density of the anode mixture layer became 1.85 g/cm$^3$. When the volume density did not become 1.85 g/cm$^3$, pressing was controlled so that the volume density was close to that value. Pressing was conducted to achieve a volume density of 1.82 g/cm$^3$, thus preparing a negative electrode of sample 1.

Sample 2

A negative electrode of sample 2 was prepared in the same manner as in sample 1, except that, as a negative electrode material, mixed particles including spherical graphite having an average particle size of 31.7 μm and non-spherical graphite having an average particle size of 11.7 μm mixed in a 1:1 mass ratio, and having particle size distribution such that D10 is 5.5 μm, D50 is 15.2 μm, and D90 is 31.4 μm were prepared, and that the anode mixture layer had a volume density of 1.85 g/cm$^3$.

Sample 3

A negative electrode of sample 3 was prepared in the same manner as in sample 1, except that, as a negative electrode material, mixed particles including spherical graphite having an average particle size of 31.7 μm and non-spherical graphite having an average particle size of 14.1 μm mixed in a 1:1 mass ratio, and having particle size distribution such that D10 is 8.5 μm, D50 is 21.9 μm, and D90 is 37.8 μm were prepared, and that the anode mixture layer had a volume density of 1.85 g/cm$^3$.

Sample 4

A negative electrode of sample 4 was prepared in the same manner as in sample 1, except that, as a negative electrode material, mixed particles including spherical graphite having an average particle size of 31.7 μm and non-spherical graphite having an average particle size of 20.3 μm mixed in a 1:1 mass ratio, and having particle size distribution such that D10 is 9.7 μm, D50 is 23.6 μm, and D90 is 41.5 μm were prepared, and that the anode mixture layer had a volume density of 1.85 g/cm$^3$.

Sample 5

A negative electrode of sample 5 was prepared in the same manner as in sample 1, except that, as a negative electrode material, mixed particles including spherical graphite having an average particle size of 42.1 μm and non-spherical graphite having an average particle size of 7.2 μm mixed in a 1:1 mass ratio, and having particle size distribution such that D10 is 4.1 μm, D50 is 11.6 μm, and D90 is 48.6 μm were prepared, and that the anode mixture layer had a volume density of 1.79 g/cm$^3$.

Sample 6

A negative electrode of sample 6 was prepared in the same manner as in sample 1, except that, as a negative electrode material, mixed particles including spherical graphite having an average particle size of 42.1 μm and non-spherical graphite having an average particle size of 11.7 μm mixed in a 1:1 mass ratio, and having particle size distribution such that D10 is 5.7 μm, D50 is 14.8 μm, and D90 is 48.7 μm were prepared.

Sample 7

A negative electrode of sample 7 was prepared in the same manner as in sample 1, except that, as a negative electrode material, mixed particles including spherical graphite having an average particle size of 42.1 μm and non-spherical graphite having an average particle size of 14.1 μm mixed in a 1:1 mass ratio, and having particle size distribution such that D10 is 7.4 μm, D50 is 21.7 μm, and D90 is 48.8 μm were prepared, and that the anode mixture layer had a volume density of 1.82 g/cm$^3$.

Sample 8

A negative electrode of sample 8 was prepared in the same manner as in sample 1, except that, as a negative electrode material, mixed particles including spherical graphite having an average particle size of 42.1 μm and non-spherical graphite having an average particle size of 20.3 μm mixed in a 1:1 mass ratio, and having particle size distribution such that D10 is 9.8 μm, D50 is 24.7 μm, and D90 is 49.2 μm were prepared, and that the anode mixture layer had a volume density of 1.80 g/cm$^3$.

Sample 9

A negative electrode of sample 9 was prepared in the same manner as in sample 1, except that, as a negative electrode material, mixed particles including spherical graphite having an average particle size of 51.3 μm and non-spherical graphite having an average particle size of 11.7 μm mixed in a 1:1 mass ratio, and having particle size distribution such that D10 is 5.7 μm, D50 is 15.7 μm, and D90 is 57.7 μm were prepared, and that the anode mixture layer had a volume density of 1.75 g/cm$^3$.

Sample 10

A negative electrode of sample 10 was prepared in the same manner as in sample 1, except that, as a negative electrode material, mixed particles including spherical graphite having an average particle size of 51.3 μm and non-spherical graphite having an average particle size of 14.1 μm mixed in a 1:1 mass ratio, and having particle size distribution such that D10 is 7.5 μm, D50 is 23.3 μm, and D90 is 57.8 μm were prepared, and that the anode mixture layer had a volume density of 1.73 g/cm$^3$.

Evaluation of Capacity

Coin cells were individually prepared using the negative electrodes of samples 1 to 10, and a capacity of each coin cell was measured.

With respect to the positive electrode, there was used a positive electrode obtained by mixing together lithium cobaltate, ketjen black, and polyvinylidene fluoride (PVdF) in a 7:2:1 ratio, and dispersing the resultant mixture in N-methyl-2-pyrrolidone (NMP) and applying the dispersion to an Al foil and then drying the dispersion applied. The coating weight was adjusted to 1.5 times the coating weight in the negative electrode.

The positive electrode and negative electrode were individually punched into discs, and the resultant positive electrode and negative electrode and a separator composed of a microporous polyethylene film were stacked on one another in the order of the positive electrode, separator, and negative electrode, and the resultant stacked structure was placed in a battery can.

Then, an electrolytic solution, which was obtained by dissolving LiPF$_6$ in a mixed solvent including ethylene carbonate and diethyl carbonate in a 3:7 mass ratio so that the concentration became 1.0 mol/l, was injected into the battery can, followed by caulking of the battery can through an insulating gasket, thereby obtaining a coin cell.

With respect to the coin cell obtained, a constant-current and constant-voltage charging at a charge current of 1 C was conducted at an upper limit voltage of 4.2 V for 2 hours, and then a 0.2 C constant-current discharging was conducted until the voltage became a cut-off voltage of 3.0 V, and a discharge capacity was measured, and the capacity was evaluated using a value determined from the following formula.

Formula:

(Initial discharge capacity)/(Theoretical capacity)× 100(%)

The results of measurement are shown in Table 1.

TABLE 1

| Negative electrode | Spherical graphite (μm) | Non-spherical graphite (μm) | Particle size distribution of mixed particles (μm) | | | Volume density (g/cm³) | (Initial discharge capacity)/ (Theoretical capacity) (%) |
|---|---|---|---|---|---|---|---|
| | | | D10 | D50 | D90 | | |
| Sample 1 | 31.7 | 7.2 | 4.1 | 10.5 | 29.6 | 1.82 | 92 |
| Sample 2 | 31.7 | 11.7 | 5.5 | 15.2 | 31.4 | 1.85 | 92 |
| Sample 3 | 31.7 | 14.1 | 8.5 | 21.9 | 37.8 | 1.85 | 93 |
| Sample 4 | 31.7 | 20.3 | 9.7 | 23.6 | 41.5 | 1.85 | 92 |
| Sample 5 | 42.1 | 7.2 | 4.1 | 11.6 | 48.6 | 1.79 | 88 |
| Sample 6 | 42.1 | 11.7 | 5.7 | 14.8 | 48.7 | 1.85 | 88 |
| Sample 7 | 42.1 | 14.1 | 7.4 | 21.7 | 48.8 | 1.82 | 87 |
| Sample 8 | 42.1 | 20.3 | 9.8 | 24.7 | 49.2 | 1.80 | 87 |
| Sample 9 | 51.3 | 11.7 | 5.7 | 15.7 | 57.7 | 1.75 | 84 |
| Sample 10 | 51.3 | 14.1 | 7.5 | 23.3 | 57.8 | 1.73 | 84 |

As can be seen from Table 1, samples 2 to 4 achieve excellent properties.

Studies on Effect of Polymer Compound Layer

Using the negative electrode of sample 3, a laminate cell (A) and a laminate cell (B) were individually prepared as follows.

Laminate Cell (A)

With respect to the positive electrode, there was used a positive electrode obtained by mixing together lithium cobaltate, ketjen black, and PVdF in a 7:2:1 (mass ratio), and dispersing the resultant mixture in NMP and applying the dispersion to both sides of an Al foil and then drying the dispersion applied. The coating amount was adjusted to 1.5 times the coating amount in the negative electrode.

With respect to the negative electrode, as with the negative electrode of sample 3, there was used a negative electrode obtained by adding PVdF as a binder to the mixed particles prepared in the same manner as in sample 3, and dispersing the resultant mixture in NMP as a solvent and applying the dispersion to both sides of a Cu foil and drying the dispersion applied, and then pressing the resultant foil so that the volume density of the anode mixture layer became 1.85 g/cm³.

With respect to the separator, a microporous polyethylene film was used. A solution obtained by dissolving PVdF in NMP so that the concentration became 15 wt % was applied to both sides of the separator and dried to form porous polyvinylidene fluoride having a thickness of 5 μm on the both sides of the separator.

A terminal was attached to each of the positive electrode and negative electrode prepared as described above, and then the positive electrode and negative electrode were put together through the separator coated with a porous fluororesin, and they were spirally wound together in the longitudinal direction to prepare a battery element.

The prepared battery element was sandwiched with a casing member composed of a laminate film, and three sides of the casing member were heat-sealed. With respect to the casing member, there was used a moisture-proof aluminum laminate film including a nylon film having a thickness of 25 μm, an aluminum foil having a thickness of 40 μm, and a polypropylene film having a thickness of 30 μm, which were stacked on one another in this order from the outermost layer.

Then, an electrolytic solution was injected into the resultant casing member containing the battery element, and the remaining one side was heat-sealed under a reduced pressure to hermetically seal the casing member. With respect to the electrolytic solution, there was used an electrolytic solution obtained by dissolving $LiPF_6$ in a mixed solvent comprising ethylene carbonate and diethyl carbonate in a 3:7 mass ratio so that the concentration became 1 mol/l. The casing member containing the battery element was sandwiched between iron plates and heated at 70° C. for 3 minutes to bond together the positive electrode, negative electrode, and separator through the porous polyvinylidene fluoride, thereby preparing a laminate cell (A).

Laminate Cell (B)

A laminate cell (B) was prepared in the same manner as in the laminate cell (A), except that no porous polyvinylidene fluoride was formed on both sides of the separator.

With respect to each of the laminate cells (A) and (B), a charging and discharging test was conducted, and a capacity retention ratio and a thickness increase ratio were measured.

Measurement of Capacity Retention Ratio

A capacity retention ratio was measured by a method in which one cycle of charge and discharge operation was conducted and then 300 cycles of charge and discharge operations were conducted, and a discharge capacity in the 1st cycle and a discharge capacity in the 300th cycle were measured and a capacity retention ratio was determined from the following formula.

Formula:

Capacity retention ratio (%)=(Discharge capacity in 300th cycle)/(Discharge capacity in 1st cycle)× 100(%)

With respect to the charging, a constant-current and constant-voltage charging at a charge current of 1.0 C was conducted at an upper limit voltage of 4.2 V for 2 hours. With respect to the discharging, a 1.0 C constant-current discharging was conducted until the voltage became a cut-off voltage of 3.0 V Measurement of Thickness Increase Ratio Under the same conditions as those in the measurement of capacity retention ratio, 300 cycles of charge and discharge operations were conducted, and subsequently a thickness of the battery in the charged state in the 1st cycle and a thickness of the battery in the charged state in the 300th cycle were measured, and a thickness increase ratio was determined from the following formula.

Formula:

Thickness increase ratio (%)=((Thickness after discharging in 300th cycle)−(Thickness after discharging in 1st cycle))/(Thickness after discharging in 1st cycle)×100(%)

A thickness of the battery was measured by means of Digimatic Indicator (manufactured and sold by Mitutoyo Corporation) in a state such that the battery was sandwiched between two parallel plates so that a difference in thickness was not caused between the measurement sites.

The results of measurements are shown in Table 2.

TABLE 2

| | Polyvinylidene fluoride | Capacity retention ratio (%) | Thickness increase ratio (%) |
|---|---|---|---|
| Laminate cell (A) | Formed | 83 | 3 |
| Laminate cell (B) | Not formed | 58 | 11 |

As can be seen from Table 2, the laminate cell (A), in which porous polyvinylidene fluoride was formed on both sides of the separator, achieved more excellent capacity retention ratio and thickness increase ratio than those of the laminate cell (B). The similar results are probably obtained with respect to the laminate cells prepared using the negative electrodes of samples 2 and 4.

Studies on Effect According to Composition of Electrolytic Solution and the Like Experiments were made to check whether a similar effect was obtained when the composition of the electrolytic solution was changed or an additive was further added. Laminate cells (C) to (K) shown below are the same as the laminate cell (A), except that the composition of the electrolytic solution is changed or an additive is further added, and, in these laminate cells, a bonding layer composed of polyvinylidene fluoride (PVdF) is formed between the electrode and the separator.

Laminate Cell (C)

A laminate cell (C) was prepared in the same manner as in the laminate cell (A) except that an electrolytic solution obtained by dissolving LiPF$_6$ in a mixed solvent including ethylene carbonate (EC) and ethylmethyl carbonate (EMC) in a 30:70 mass ratio so that the concentration became 1 mol/l was used.

Laminate Cell (D)

A laminate cell (D) was prepared in the same manner as in the laminate cell (A), except that an electrolytic solution obtained by dissolving LiPF$_6$ in a mixed solvent including ethylene carbonate (EC) and dimethyl carbonate (DMC) in a 30:70 mass ratio so that the concentration became 1 mol/l was used.

Laminate Cell (E)

A laminate cell (E) was prepared in the same manner as in the laminate cell (A), except that an electrolytic solution obtained by dissolving LiPF$_6$ in a mixed solvent including ethylene carbonate (EC), diethyl carbonate (DEC), and propylene carbonate (PC) in a 25:70:5 mass ratio so that the concentration became 1 mol/l was used.

Laminate Cell (F)

A laminate cell (F) was prepared in the same manner as in the laminate cell (A), except that an electrolytic solution obtained by dissolving LiPF$_6$ in a mixed solvent including ethylene carbonate (EC), ethylmethyl carbonate (EMC), and propylene carbonate (PC) in a 25:70:5 mass ratio so that the concentration became 1 mol/l was used.

Laminate Cell (G)

A laminate cell (G) was prepared in the same manner as in the laminate cell (A), except that an electrolytic solution obtained by adding 4-fluoro-1,3-dioxolan-2-one (FEC) in an amount of 1.0 wt % to a mixed solvent including ethylene carbonate (EC) and diethyl carbonate (DEC) in a 30:70 mass ratio and dissolving LiPF$_6$ in the resultant solvent so that the concentration became 1 mol/l was used.

Laminate Cell (H)

A laminate cell (H) was prepared in the same manner as in the laminate cell (A), except that an electrolytic solution obtained by adding 4-fluoro-1,3-dioxolan-2-one (FEC) in an amount of 1.0 wt % to a mixed solvent including ethylene carbonate (EC), diethyl carbonate (DEC), and propylene carbonate (PC) in a 25:70:5 mass ratio and dissolving LiPF$_6$ in the resultant solvent so that the concentration became 1 mol/l was used.

Laminate Cell (I)

A laminate cell (I) was prepared in the same manner as in the laminate cell (A), except that an electrolytic solution obtained by adding 4-fluoro-1,3-dioxolan-2-one (FEC) in an amount of 1.0 wt % to a mixed solvent including ethylene carbonate (EC), ethylmethyl carbonate (EMC), and propylene carbonate (PC) in a 25:70:5 mass ratio and dissolving LiPF$_6$ in the resultant solvent so that the concentration became 1 mol/l was used.

Laminate Cell (J)

A laminate cell (J) was prepared in the same manner as in the laminate cell (A), except that an electrolytic solution obtained by dissolving LiPF$_6$ in a mixed solvent including ethylene carbonate (EC), diethyl carbonate (DEC), and ethylmethyl carbonate (EMC) in a 30:35:35 mass ratio so that the concentration became 1 mol/l was used.

Laminate Cell (K)

A laminate cell (K) was prepared in the same manner as in the laminate cell (A), except that an electrolytic solution obtained by adding 4-fluoro-1,3-dioxolan-2-one (FEC) in an amount of 1.0 wt % to a mixed solvent including ethylene carbonate (EC), diethyl carbonate (DEC), and ethylmethyl carbonate (EMC) in a 30:35:35 mass ratio and dissolving LiPF$_6$ in the resultant solvent so that the concentration became 1 mol/l was used.

With respect to each of the laminate cells (C) to (K) prepared, a capacity retention ratio and a thickness increase ratio after the 300 cycles were measured in the same manner as in the laminate cell (A).

The results of measurements for the laminate cells (C) to (K) and laminate cell (A) are shown in Table 3.

TABLE 3

| | Formulation of electrolytic solution (Mass ratio) | | | | | FEC (wt %) | Capacity retention ratio (%) | Thickness increase ratio (%) |
|---|---|---|---|---|---|---|---|---|
| | EC | DEC | EMC | DMC | PC | | | |
| Laminate cell (A) | 30 | 70 | 0 | 0 | 0 | 0 | 83 | 3.0 |
| Laminate cell (C) | 30 | 0 | 70 | 0 | 0 | 0 | 80 | 4.2 |
| Laminate cell (D) | 30 | 0 | 0 | 70 | 0 | 0 | 79 | 4.6 |
| Laminate cell (E) | 25 | 70 | 0 | 0 | 5 | 0 | 81 | 4.1 |
| Laminate cell (F) | 25 | 0 | 70 | 0 | 5 | 0 | 78 | 4.9 |

TABLE 3-continued

| | Formulation of electrolytic solution (Mass ratio) | | | | | FEC (wt %) | Capacity retention ratio (%) | Thickness increase ratio (%) |
|---|---|---|---|---|---|---|---|---|
| | EC | DEC | EMC | DMC | PC | | | |
| Laminate cell (G) | 30 | 70 | 0 | 0 | 0 | 1 | 86 | 2.2 |
| Laminate cell (H) | 25 | 70 | 0 | 0 | 5 | 1 | 83 | 3.2 |
| Laminate cell (I) | 25 | 0 | 70 | 0 | 5 | 1 | 82 | 3.8 |
| Laminate cell (J) | 30 | 35 | 35 | 0 | 0 | 0 | 81 | 4.0 |
| Laminate cell (K) | 30 | 35 | 35 | 0 | 0 | 1 | 83 | 3.3 |

EC: Ethylene carbonate
DEC: Diethyl carbonate
EMC: Ethylmethyl carbonate
DMC: Dimethyl carbonate
PC: Propylene carbonate
FEC: 4-Fluoro-1,3-dioxolan-2-one As can be seen from Table 3, the laminate cells having various formulations of electrolytic solution achieved excellent results. In addition, the above results have ascertained that the use of an additive, such as 4-fluoro-1,3-dioxolan-2-one (FEC), possibly further improves the properties. The reason that expansion was suppressed when 4-fluoro-1,3-dioxolan-2-one (FEC) was added resides in that a film is formed on the surface of the negative electrode during the initial charging to suppress decomposition of the electrolytic solution (gas generation) on the surface of the charged negative electrode. When the thickness increase ratio is 9% or less, a capacity retention ratio of 70% or more can be expected.

Change of negative electrode volume density due to charge and discharge operations

TEST EXAMPLE

With respect to the negative electrode, as with the negative electrode of sample 3, there was used a negative electrode obtained by adding PVdF as a binder to the mixed particles prepared in the same manner as in sample 3, and dispersing the resultant mixture in NMP as a solvent and applying the dispersion to both sides of a Cu foil and drying the dispersion applied, and then pressing the resultant foil so that the volume density of the anode mixture layer became 1.80 g/cm$^3$. Using this negative electrode, a laminate cell was prepared in the same manner as in the laminate cell (A).

With respect to the laminate cell prepared, one cycle of charge and discharge operation at an upper limit voltage of 4.2 V, 4.3 V, or 4.4 V was conducted, and a volume density of the anode mixture layer in the completely discharged state was measured. With respect to the charging, a constant-current and constant-voltage charging at a charge current of 1.0 C was conducted at a charge voltage of 4.2 V, 4.3 V, or 4.4 V for 2 hours. With respect to the discharging, a 0.2 C constant-current discharging was conducted until the voltage became a cut-off voltage of 3.0 V.

The results of measurement are shown in Table 4.

TABLE 4

| | Volume density of anode mixture layer of electrode just prepared (g/cm$^3$) | Charge voltage (V) | Volume density of anode mixture layer in completely discharged state (g/cm$^3$) |
|---|---|---|---|
| Test example | 1.80 | 4.2 | 1.64 |
| | | 4.3 | 1.61 |
| | | 4.4 | 1.59 |

As can be seen from Table 4, as the charge voltage increases and the electrode more markedly expands, the electrode hardly shrinks in the complete discharge until the voltage becomes 3 V, so that the volume density tends to be smaller.

According to embodiments, the volume density of the electrode mixture layer is high, and the battery can be prevented from suffering deformation even when using a laminate film as a casing member, thus achieving excellent battery properties. Further, in the present application, the volume density of the electrode mixture layer can be increased, making it possible to produce a battery having high energy density.

The present application is not limited to the above embodiment of the present application, and can be changed or modified as long as the non-aqueous electrolyte battery of the present application can be obtained. For example, in the non-aqueous electrolyte battery according to an embodiment, with respect to the shape of cylinder, rectangle, or the like, there is no particular limitation, and the battery may be of various sizes, such as a thin type or a large size. Furthermore, the non-aqueous electrolyte battery is not limited to the secondary battery, and can be applied to other batteries, such as a primary battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A non-aqueous electrolyte battery comprising:
   a positive electrode;
   a negative electrode;
   a film casing that encloses the non-aqueous electrolyte battery; and
   a separator disposed between the positive electrode and the negative electrode,
   wherein the negative electrode includes an anode mixture layer having a volume density of 1.70 to 1.90 g/cm$^3$ prior to being subjected to charge and discharge processes,
   wherein the anode mixture layer includes mixed particles composed of spherical graphite having an average particle size of 25 to 35 μm and non-spherical graphite having an average particle size of 8 to 22 μm,
   wherein the spherical graphite together with the non-spherical graphite have particle size distributions such that D10 is 5 to 11 μm, D50 is 13 to 25 μm, and D90 is 27 to 45 μm, wherein polymer compound layers are disposed between the negative electrode and the separator, and between the positive electrode and the separator, wherein the polymer compound layers are composed of a porous polymer compound retaining an electrolytic solution therein, and wherein the polymer compound layers have a bonding strength of 5 mN/mm or more with at least one of the positive and negative electrodes and the separator.

2. The non-aqueous electrolyte battery according to claim 1, wherein the polymer compound layers have a uniform thickness.

3. The non-aqueous electrolyte battery according to claim 1, wherein:
the spherical graphite is mesocarbon microbeads; and
the non-spherical graphite is a powder obtained by pulverizing mesocarbon microbeads.

4. The non-aqueous electrolyte battery according to claim 1, wherein the polymer compound layers contain a polymer compound including repeating units derived from vinylidene fluoride.

5. The non-aqueous electrolyte battery according to claim 1, wherein the polymer compound layers contain a copolymer including at least repeating units derived from vinylidene fluoride and repeating units derived from hexafluoropropylene.

6. The non-aqueous electrolyte battery according to claim 1, wherein:
the positive electrode, the negative electrode, the separator, and the polymer compound layers are spirally wound together to form a battery element; and
the battery has a flattened shape.

7. The non-aqueous electrolyte battery according to claim 6, wherein the film casing is composed of a moisture-proof laminate film including a polymer film and a metallic foil.

8. The non-aqueous electrolyte battery according to claim 1, wherein the anode mixture layer has a volume density of 1.50 to 1.90 g/cm$^3$ with respect to a cell ready for shipping, the cell being subjected to 0.2 C constant-current discharging until becoming a cut-off voltage of 3.0 V.

9. The non-aqueous electrolyte battery according to claim 1, wherein the non-spherical graphite is in the shape of at least one of flakes, fiber, and bulk.

10. The non-aqueous electrolyte battery according to claim 1, wherein the polymer compound layers are formed by forming a porous fluorine polymer compound on the separator and then allowing the porous fluorine polymer to retain an electrolytic solution having carbonic ester solvent selected from the group of ethylene carbonate, dimethyl carbonate, ethylmethyl carbonate, diethyl carbonate, and combinations thereof.

11. The non-aqueous electrolyte battery according to claim 1, wherein the polymer compound layers include porous polyvinylidene fluoride and the thickness of the porous polyvinylidene fluoride is 5 μm.

12. A non-aqueous electrolyte battery comprising: a positive electrode; a negative electrode; a film casing that encloses the non-aqueous electrolyte battery; and a separator disposed between the positive electrode and the negative electrode, in the negative electrode includes an anode mixture layer having a volume density of 1.70 to 1.90 g/cm$^3$ prior to being subjected to charge and discharge processes, wherein the anode mixture layer includes mixed particles composed of spherical graphite having an average particle size of 25 to 35 μm and non-spherical graphite having an average particle size of 8 to 22 μm, wherein the spherical graphite together with the non-spherical graphite have particle size distributions such that D10 is 5 to 11 μm, D50 is 13 to 25 μm, and D90 is 27 to 45 μm, wherein polymer compound layers are disposed on both sides of the separator, wherein the polymer compound layers are composed of a porous polymer compound retaining an electrolytic solution therein, and wherein the polymer compound layers have a bonding strength of 5 mN/mm or more with at least one of the positive and negative electrodes and the separator.

13. The non-aqueous electrolyte battery according to claim 12, wherein the polymer compound layers have a uniform thickness, the polymer compound layers include porous polyvinylidene fluoride, and the thickness of the porous polyvinylidene fluoride is 5 μm.

14. The non-aqueous electrolyte battery according to claim 12, wherein:
the spherical graphite is mesocarbon microbeads; and
the non-spherical graphite is a powder obtained by pulverizing mesocarbon microbeads.

15. The non-aqueous electrolyte battery according to claim 12, wherein the polymer compound layers contain a polymer compound including repeating units derived from vinylidene fluoride.

16. The non-aqueous electrolyte battery according to claim 12, wherein the polymer compound layers contain a copolymer including at least repeating units derived from vinylidene fluoride and repeating units derived from hexafluoropropylene.

17. The non-aqueous electrolyte battery according to claim 12, wherein:
the positive electrode, the negative electrode, the separator, and the polymer compound layers are spirally wound together to form a battery element; and
the battery has a flattened shape.

18. The non-aqueous electrolyte battery according to claim 17, wherein the film casing is composed of a moisture-proof laminate film including a polymer film and a metallic foil.

19. The non-aqueous electrolyte battery according to claim 12, wherein the non-spherical graphite is in the shape of at least one of flakes, fiber, and bulk.

20. The non-aqueous electrolyte battery according to claim 12, wherein the polymer compound layers are formed by forming a porous fluorine polymer compound on the separator and then allowing the porous fluorine polymer to retain an electrolytic solution having carbonic ester solvent selected from the group of ethylene carbonate, dimethyl carbonate, ethylmethyl carbonate, diethyl carbonate, and combinations thereof.

* * * * *